Patented June 29, 1948

2,444,333

UNITED STATES PATENT OFFICE 2,444,333

PROCESS FOR THE MANUFACTURE OF THERMOSETTING SYNTHETIC RESINS BY THE POLYMERIZATION OF ALKYLENE OXIDE DERIVATIVES

Pierre Castan, Zurich, Switzerland, assignor to De Trey Freres S. A., Zurich, Switzerland No Drawing. Application May 2, 1944, Serial No. 533,790. In Switzerland June 16, 1943

1 Claim. (Cl. 260—47)

It is known for a long time that ethylene-oxide may be polymerised under the action of certain catalysers. The result of this reaction are almost sticky to waxy substances, which are fusible. It is also possible to polymerise ethylene-oxide derivatives, as for instance is known from British Patent Spec. 477,843, but again only resins which cannot be hardened are produced thereby.

The object of the present invention is the production of thermo-setting synthetic resins and, according to the invention, such synthetic resins are formed if an ethylene-oxide derivative which contains at least 2 ethylene-oxide groups in the molecule is polymerised under the action of certain catalysers; in this case, hard and infusible resins are obtained which show important resistance against chemical and physical agents.

As examples of the substances which may be used for such reaction, the following are mentioned:

(a) Ethylene-oxide derivatives:

The compounds which are formed by the reaction of bivalent phenols and epichlorhydrin in alkaline solutions. As bivalent phenols, hydroquinone, resorcin and the condensation products of phenols with aliphatic-, arylaliphatic-, aryl- and cyclo-ketones, for instance diphenylolpropane may be used, also dioxy-diphenyl-sulphone.

(b) As catalysers, inorganic or organic bases may be used, as for example:

Inorganic bases: alkali hydroxides, calcium oxide, sodium amide, etc, organic bases: amines (especially secondary aliphatic amines) as for instance di-ethylamine, di-butylamine, piperidine, also derivatives of these amines, as for instance piperidine benzoate, the piperidine salt of pentamethylene-dithiocarbamic acid, the di-ethylamine salt of diethyldithiocarbamic acid, and also the combination of piperidine with benzaldehyde. Other amines are trimethylamine, triethanolamine, etc. Guanidine and guanidine derivates may also be used.

Generally speaking, the process consists of 2 different phases:

(1) A phenol, at least bivalent, is reacted in alkaline, aqueous or alcoholic solution with epichlorhydrin. An ethylene-oxide-derivative results, which can either be unpolymerised or partially polymerised, according to the phenols used and to the working methods applied. It is also possible to react a phenol with α-dichlorhydrin in taking for each phenolic hydroxyl group 1 gramme-molecule of α-dichlorhydrin and 2 grammes-molecules of NaOH. By washing or dissolving and filtering, the chlorides formed are separated and the product is freed from the solvents and from the water by heating it in vacuo. Either crystalline or resinous substances remain.

(2) In the second phase, the substances which have been produced during the first phase are polymerised under the influence of the said catalyser. The ethylene-oxide derivative is melted and the catalyser added to the melted mass. The quantity of catalyser may vary between 0.1 and 5% of the ethylene-oxide derivative.

The hardening takes place rather quickly; it can, for instance, be finished at 100° C. in 1 hour. One can also work with higher temperatures; however, to obtain bubble-free pieces, it is necessary to work under the boiling point of the amine used as catalyser. The hardening reaction is not disturbed by water and steam; on the contrary, small quantities of water seem to increase the reaction speed. This characteristic is very valuable, for certain purposes, as for instance the production of dentures, where the material is worked in humid plaster forms. If necessary, the resins can be colored in any shades, either with organic or inorganic dyes. Filling materials, such as asbestos, wood-meal and the like can also be added to them, also plasticizers. These dyes, filling materials and plasticizers must be inert against the alkaline substances used as catalysers.

Example 1

110 grams of resorcin are dissolved in 2 gramme-molecules of a 20% solution of caustic soda, heated up to 75° C. and in the course of ½ hour, 180 grams epichlorhydrin are added drop by drop with continuous stirring. Stirring is continued for another hour, the product cooled and washed free from chlorine. The product is then dehydrated on the water-bath, in vacuo. To the fused product 5 grams piperidine are added and the whole mass is cooled down. There remains a hard resin having a melting point of about 65° C., which is soluble in acetone and benzene. It hardens in 1½ hour when heated up to 100° C. and becomes infusible and insoluble.

Example 2

228 grams of diphenylolpropane are dissolved in 2 gramme-molecules of a 15% caustic soda solution and heated to 65° C. To this solution 185 grammes of epichlorhydrin are added drop by drop in the course of one hour at the same temperature with continuous stirring. At first, a soft resin is formed, which becomes more and more hard. After the desired consistency has been reached, the resin is washed free from chlorine.

The resin can also be dissolved in acetone and the deposited salts separated by filtering. Then the resin is freed from water (eventually also from the solvents). A hard resin of a light yellowish color remains. Its melting point is about 75° C. This resin is then melted and 4% of the piperidine salt of pentamethylene dithiocarbamic acid are added. A light yellowish resin results which, in 60 minutes at 100° C., becomes infusible and insoluble. The unhardened resin is soluble in acetone, chloroform and 1:4 alcohol-benzol solution; it is insoluble in water, benzol, alcohol, carbontetrachloride.

The hardened substances are hard but not brittle, of a light yellowish or brown color. They are neither sensitive to light, nor water up to 100° C. They resist temperatures up to 100° C., and are not easily inflammable. They can be worked without difficulties by filing, shaping, or turning. They adhere very well to glass, porcelain and metals and are good insulating materials. The product obtained can very well be used for cast, moulded and pressed articles, such as fancy goods, electro-technical articles, billiard balls, dentures. In the form of solution, they can also be used as varnish which hardens very quickly, offers great adherence and good resistance.

I claim:

In the process of hardening resinous substances containing at least two ethylene oxide groups obtained by reacting one mol of a dihydric phenol with two mols of a compound of the group consisting of epichlorhydrine and α-dichlorhydrine in the presence of a proportion of alkali sufficient to bind the hydrochloric acid formed in the reaction and then freeing the resulting resin of any chlorides present, the steps of mixing the thus purified resin with 0.1–5 percent of an alkaline catalyst and heating the mixture to harden the resin.

PIERRE CASTAN.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,136,928 | Schlack | Nov. 5, 1938 |
| 2,319,876 | Moss | May 25, 1943 |